United States Patent
Westerdahl et al.

(10) Patent No.: US 8,187,517 B2
(45) Date of Patent: May 29, 2012

(54) USE OF A TOOL AND A METHOD FOR PRODUCING A SURFACE MEMBER

(75) Inventors: Anders Westerdahl, Linköping (SE); Ingemar Turesson, Linköping (SE)

(73) Assignee: SAAB AB, Linköping (SE)

( * ) Notice: Subject to any disclaimer, the term of this patent is extended or adjusted under 35 U.S.C. 154(b) by 680 days.

(21) Appl. No.: 11/468,344

(22) Filed: Aug. 30, 2006

(65) Prior Publication Data
US 2007/0057405 A1 Mar. 15, 2007

(30) Foreign Application Priority Data
Sep. 9, 2005 (EP) .................................. 05108307

(51) Int. Cl.
B28B 7/30 (2006.01)
B28B 21/00 (2006.01)

(52) U.S. Cl. ........ 264/313; 264/316; 425/393; 425/438; 425/440

(58) Field of Classification Search .................. 264/258, 264/313, 316; 425/393, 438, 440, 303; B29C 53/82
See application file for complete search history.

(56) References Cited

U.S. PATENT DOCUMENTS

| | | | | |
|---|---|---|---|---|
| 1,553,154 A | * | 9/1925 | Gammeter | 264/257 |
| 3,995,081 A | * | 11/1976 | Fant et al. | 428/119 |
| 4,242,160 A | * | 12/1980 | Pinter et al. | 156/175 |
| 4,675,061 A | * | 6/1987 | Mead | 156/155 |
| 5,208,051 A | * | 5/1993 | Berg et al. | 425/393 |
| 5,271,986 A | * | 12/1993 | Dublinski et al. | 428/156 |
| 5,368,807 A | | 11/1994 | Lindsay et al. | |
| 5,549,370 A | * | 8/1996 | Folsom | 267/149 |
| 6,458,309 B1 | * | 10/2002 | Allen et al. | 264/319 |
| 2006/0231981 A1 | * | 10/2006 | Lee et al. | 264/320 |

FOREIGN PATENT DOCUMENTS

| | | |
|---|---|---|
| DE | 10228406 | 1/2003 |
| EP | 0244337 | 11/1987 |
| JP | 08207134 | 8/1996 |
| JP | 08207134 A * | 8/1996 |

OTHER PUBLICATIONS

Airtech Advanced Materials Group's Masterflex "S" Series Data Sheet ("Data Sheet—Masterflex "S" Series", Airtech Advanced Materials Group, Mar. 24 1997, http://www.airtechonline.com/catalog).*
Mallick, P. K., Fiber-Reinforced Composites—Materials, Manufacturing, and Design, CRC Press, 2008, pp. 15-16.*
Toray USA Composite Glossary (http://www.torayusa.com/cfa/terminology.html).*

* cited by examiner

*Primary Examiner* — Philip Tucker
*Assistant Examiner* — William Bell
(74) *Attorney, Agent, or Firm* — Venable LLP; Eric J. Franklin

(57) ABSTRACT

A helical tool (1', 1") having a rigid outer helical support surface (2) is used as support for a non-rigid material for producing a hollow elongated member onto and as an integral part with a surface member (3) in manufacturing of a surface member having at least one hollow elongated stiffening member integral therewith.

10 Claims, 2 Drawing Sheets

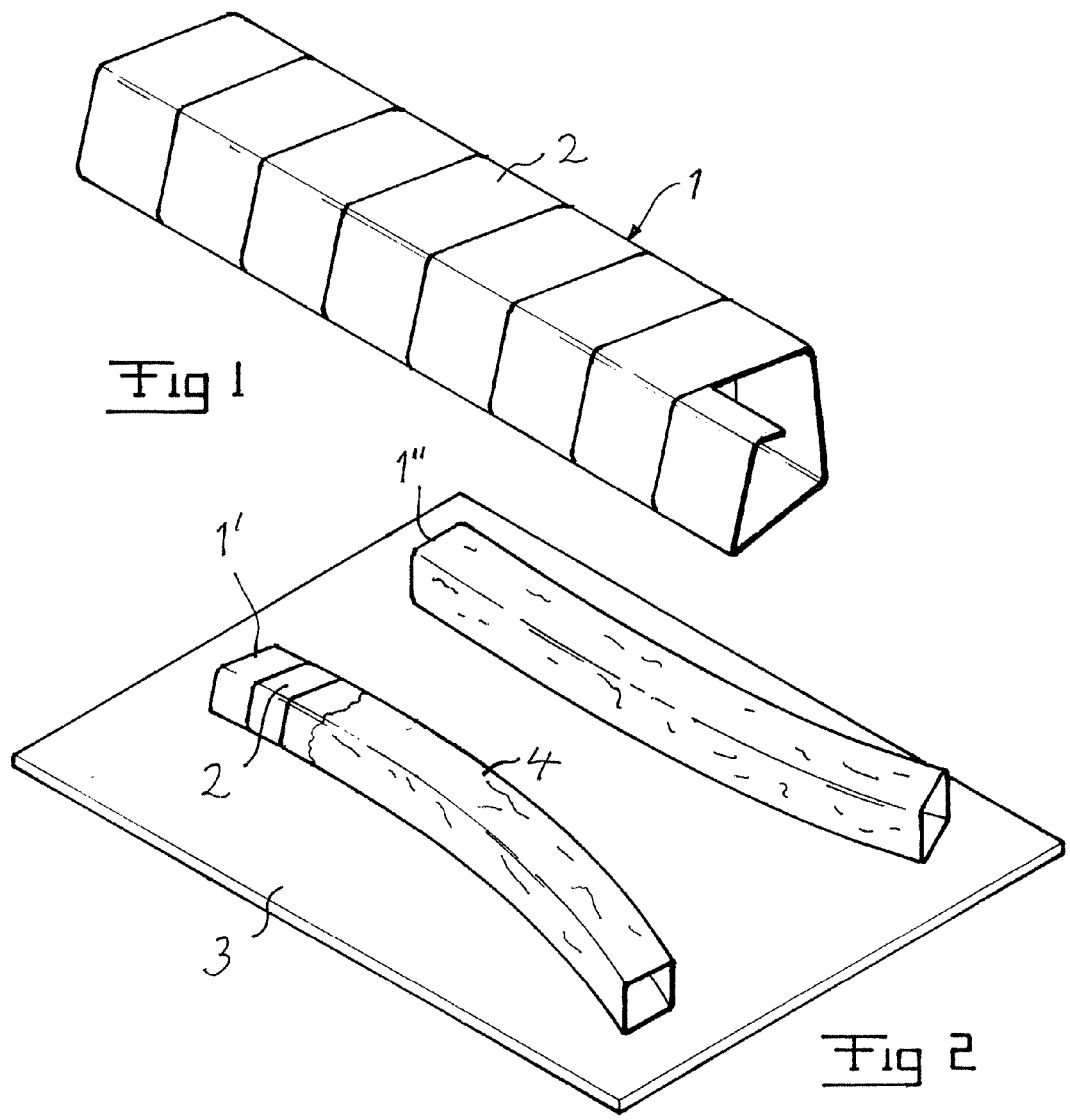

//USE OF A TOOL AND A METHOD FOR PRODUCING A SURFACE MEMBER

TECHNICAL FIELD OF THE INVENTION AND PRIOR ART

The present invention relates to manufacturing of surface members having at least one hollow elongated stiffening member integral therewith.

Surface member means in this context a member having two opposite large sides at a distance being small with respect to the dimensions of the surfaces of these sides. Thus, the surface member may be a plate, but it has not to be flat, but it may for instance be curved. Moreover, it is not necessary that said two large sides extend in parallel with each other, i.e. the thickness of the surface member may vary.

For illuminating the present invention but not in any way restricting the scope thereof the production of such surface members for structural components of an aircraft may be mentioned. Such components, for instance parts of a wing or the fuselage of an aircraft have to have a high mechanical strength combined with a low weight. This is achieved by producing such a surface member by using a fibre composite material being very light with respect to the mechanical strength thereof combined with the provision of the surface member with one or more said hollow elongated, mostly beam-like stiffening members integral therewith.

When producing these hollow elongated members as an integral part with a said surface member, a tool supporting the material used for this hollow member when this material is cured has to be used for obtaining the shape desired for said elongated member. This so-called shaping tool has to be withdrawn from the elongated member once cured or solidified. Known methods for producing this type of surface members having such stiffening members integral therewith requires a separate tool for each desired shape of a said elongated member. These tools are rigid members which has to have a desired shape, i.e. curvature and cross section, for making it possible to withdraw them from the hollow elongated member once the material thereof has cured. Each such tool may then only be used for producing an elongated member of a predetermined shape.

It is also known to use a shaping material produced in a so-called master tool for obtaining a desired shape and which after curing of the material forming the hollow elongated member is flushed out thereof by any type of liquid. However, when using such a shaping material this has to be shaped again each time a new said surface member has to be manufactured.

It is therefor a desire to improve the manufacturing of surface members of this so-called "integrally stiffened article" type by using a tool being able to reliably support the shape of said hollow elongated member when this is cured, but which is easy to remove after said curing, may be used for different shapes of such an hollow elongated member and is able to withstand shape changes required therefor so as to be able to be used repeatedly.

SUMMARY OF THE INVENTION

The object of the present invention is to find a way to improve the methods known so far for producing a surface member having at least one hollow elongated stiffening member integral therewith with the aim of satisfying the above desire.

This object is according to the invention obtained by suggesting the use of a helical tool having a rigid outer helical support surface as support for a non-rigid material for producing a hollow elongated member onto and as an integral part with a surface member in manufacturing of a surface member having at least one hollow elongated stiffening member.

By using such a helical tool for supporting said non-rigid material when producing an elongated stiffening member on top of and integral with a said surface member a number of advantages may be obtained. Thanks to the helical structure the tool may be shaped to be straight or curved according to the requirements of the article produced in each particular case, and once this tool has been applied upon said surface member in the desired curvature shape it may without problems be brought to maintain this shape during the curing of the material used to produce the hollow elongated member. Once this elongated member has been produced it is easy to withdraw the tool from this member, since the cross-section thereof will be slightly reduced when gripping one end of such a helical tool and trying to pull it out of the elongated member. The tool may then be repeatedly reused while being influenced to take other curvature shapes when necessary.

The use of a helical tool when moulding straight hollow elongated articles for being able to withdraw the tool after the moulded article has cured is known through JP 08-207 134. However, this document only discloses the moulding of straight hollow elongated articles while utilising the helical shape for facilitating withdrawal of the tool and not the manufacturing of surface members with hollow elongated stiffening members integral therewith associated with quite different problems and in which the use of such a tool has a number of other advantages.

Other examples of "tools" with a possibility to be withdrawn from a hollow elongated member when this is cured by obtaining a cross-section reduction of these tools are disclosed in U.S. Pat. Nos. 4,675,061 and 4,624,874.

According to an embodiment of the invention the tool is used for manufacturing a stiffened panel, and according to another embodiment this stiffened panel may be adapted to form a part of an aircraft, such as a part of a wing or the fuselage of an aircraft. This use of the tool may remarkably facilitate the production of such a stiffened panel in the aircraft industry without any need of a large number of such tools when producing a variety of such stiffened panels.

According to another embodiment of the invention the tool is used for placing a plurality of fibre composite layers in a laminate onto the tool for later curing with the tool on a surface member in the form of a fibre composite layer shell or plate.

According to another embodiment of the invention the fibre composite comprises carbon fibre epoxy, and an alternative is that the fibre composite comprises glass fibre polyester.

According to another embodiment of the invention the tool is used for producing a surface member having at least one curved stiffening member shaped by said tool. Thanks to the helical character of the tool such a curvature shape may be obtained and the tool still be easily withdrawn and reused after assuming another curvature shape when desired.

According to another embodiment of the invention the tool is a helical tool made of glass fibre fabric embedded into a matrix plastic cured to a helical shape. This is one example of materials through which such a tool may be made rigid enough for maintaining the shape and supporting said non-rigid material forming the hollow elongated member while still be sufficiently flexible for being removed from such a member with an arbitrary curvature shape and withstand curvature shape changes for being repeatedly reused.

The invention also relates to a method for producing a surface member having at least one hollow elongated stiffening member integral therewith, which is characterized by the following steps:

a) a helical tool having a rigid outer helical support surface is applied on a surface member while making it extending thereon according to a desired shape, b) flabby layers of a fibre composite material are laid in mutual superposition onto said support surface of said tool, c) the material applied onto said support surface is brought to cure, and d) the tool is withdrawn from the hollow elongated stiffening member formed externally thereof through one end of this elongated member, and the steps are carried out in the order mentioned or the order of the steps a) and b) is changed.

Surface members having at least one hollow stiffening member integral therewith of a high quality and with varying structures may be produced through this method to an attractive cost.

According to an embodiment of the invention the tool is in step a) laid onto a surface member of an uncured fibre composite laminate, and in step c) the entire article comprising the surface member and the elongated member or members thereof is brought to cure. This means that the tool may be bent to a curved shape and maintain this shape once placed on the surface member without any additional means needed therefor.

According to another embodiment of the invention heat is applied to the surface member with the hollow elongated member thereon in step c) for said curing, for instance by arranging these members in an oven.

According to another embodiment of the invention a gas over-pressure is in step c) through one or more bags together forming a closed volume applied onto the surface member and the layers applied upon said support surface of the tool as well as on the inner surfaces of the tool during said curing. This means that said hollow elongated stiffening member may assume a perfect shape once cured.

According to another embodiment of the invention a so-called release foil of a material not binding to said material laid onto said tool is applied on said tool before applying said layers of said material onto the tool for facilitating said withdrawal of the tool in step d). The use of such a so-called release foil avoiding that the tool sticks to said material cured makes it even easier to remove the tool from the stiffened hollow elongated member.

Further advantages as well as advantageous features of the invention appear from the following description.

BRIEF DESCRIPTION OF THE DRAWINGS

With reference to the appended drawings, below follows a specific description of embodiments of the invention cited as examples.

In the drawings:

FIG. 1 is a perspective view of a tool used according to the present invention,

FIG. 2 is a perspective view illustrating the use of two tools according to FIG. 1 for manufacturing a stiffened panel, FIG. 3 is a cross-section view of a tool according to FIG. 1 in a step during said manufacturing.

DETAILED DESCRIPTION OF EMBODIMENTS OF THE INVENTION

Figure 4:
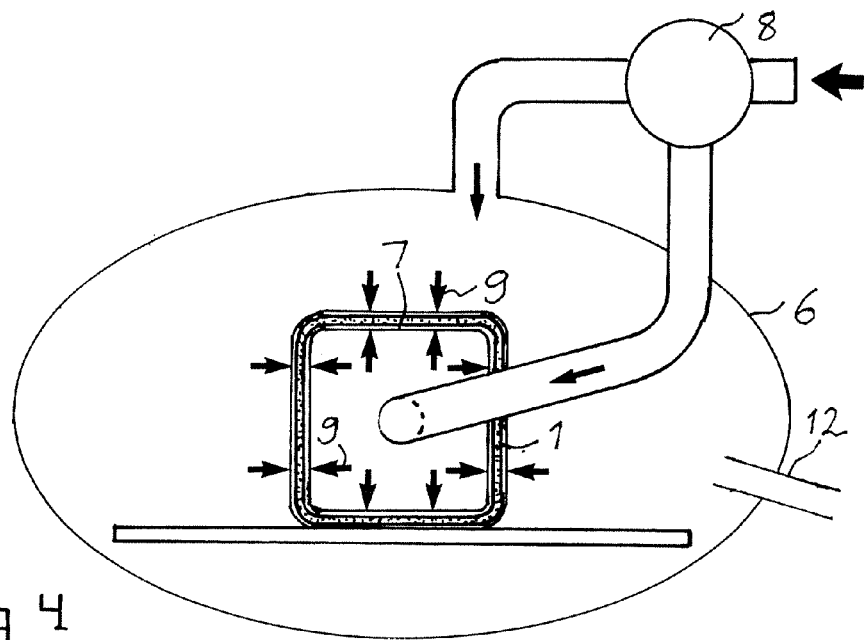
FIG. 4 is a view illustrating a further step in the manufacturing of a surface member having a hollow elongated stiffening member integral therewith, FIG. 5 schematically illustrates a final step of said manufacturing.

FIG. 1 shows a helical tool 1 having a rigid outer helical support surface 2 adapted to act as a support for a non-rigid material for producing a hollow elongated member onto and as an integral part with a surface member in manufacturing of a surface member having at least one elongated stiffening member integral therewith. The tool 1 may be made of any material fulfilling the requirements of maintaining the shape during said manufacture, be able to be at least slightly prolonged when applying a pulling force in the longitudinal direction thereof for at least slightly reducing the cross-section and making it possible to bend it as shown in FIG. 2 without destroying it, but making it possible to reuse it while assuming another shape when desired. For fulfilling these requirements the helical tool may be made of glass fibre fabric embedded into a matrix plastic cured to this shape. Furthermore, the material for the tool may be provided on rolls and cut into lengths suitable for the use thereof.

FIG. 2 schematically illustrates a step of the production of a surface member having two hollow elongated stiffening members integral therewith. The surface member 3 is here formed by superimposing a plurality of fibre composite layers, for example of carbon fibre epoxy or glass fibre polyester. Each such layer may for example have a thickness of 0.1-0.3 mm, and the number of such layers forming the surface member may be 4-100, but other figures than these are also possible. The tools 1', 1" have been covered by a release foil 4 for facilitating the later withdrawal of the tools once the material applied thereonto has cured.

It is shown how the tools 1', 1" has been curved into a desired shape and placed upon the surface member 3. A laser projection or jigs may be used for applying the tools in a predetermined position. After this has been done thin layers of a fibre composite material, such as carbon fibre epoxy or glass fibre polyester are laid in mutual superposition onto the support surface 2 of the respective tool. It is also possible to do this before placing the tools on the surface member, which is indicated in FIG. 3, and in that case the layers 5 may be wrapped completely around the tool, which will not be the case when these layers are applied on the tool already positioned on the surface member.

FIG. 4 schematically illustrates the step in the method of producing said stiffened panel following upon the steps of applying the tool or tools on the surface member and applying the layers of a fibre composite material onto the tools. It is shown how the entire article composed of the surface member with a tool and the layers applied thereonto is exerted to a gas over-pressure by applying a first bag 6 around the entire article and a second bag 7 inside the tool. It is schematically illustrated how these bags are connected to the same means 8, such as a pump, for producing said over-pressure. The two bags 6, 7 are interconnected for together forming a closed volume, which however is ventilated for obtaining the desired pressure on the tool and the layers applied thereonto as indicated through a tube 12. The result of this is that an over-pressure is applied onto the tool and the layers applied thereonto from the inside and from the outside as illustrated by the arrows 9. The article is preferably also exerted to heat for curing the layers laid onto the tool and possibly also the surface member 3. The article may for this sake be placed in an autoclave press in which also the surface member may be shaped by so-called bagging. However, it is possible to use a material for said layers not requiring any heat for curing.

Figure 5:
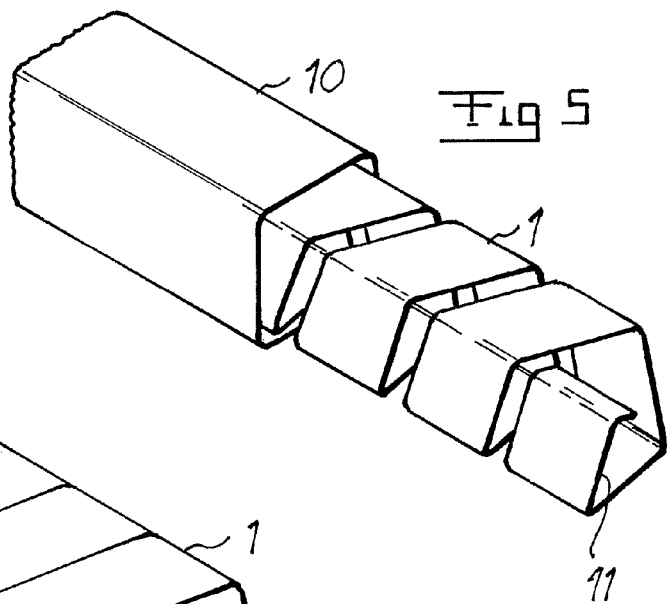

Once the curing or stiffening is completed the tool is withdrawn from the hollow elongated member 10 thus formed and typically having a wall thickness of 0.5-2 mm (although other figures than these are also possible) by applying a traction force at one end 11 of the tool prolonging the helical tool while reducing the cross-section thereof as shown in FIG. 5. This withdrawal will be facilitated by the arrangement of said release foil of a material not binding to the fibre composite material onto the tool. The tool may in this way be very easily and rapidly removed from the article thus formed for being used in the production of a new article.

Figure 6:
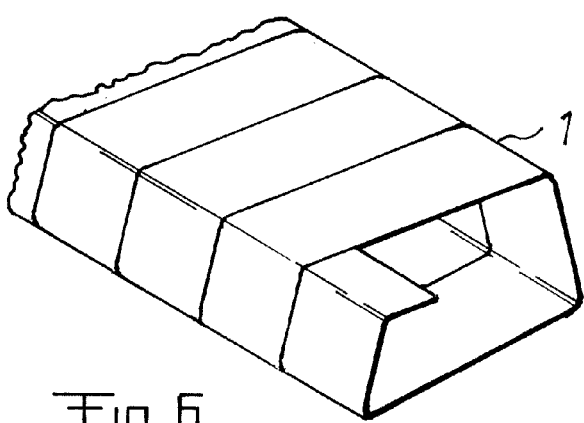
FIG. 6 is a perspective view of a part of a tool adapted to be used according to the invention and having another cross-section than the tool shown in FIG. 1.

FIG. 6 schematically illustrates a tool of the type shown in FIG. 1 but having a rectangular cross-section shape instead of a square one. However, the invention is not restricted to any particular cross-section shape of the tool, but this may be any type of polygonal or even circular.

The invention is of course not in any way restricted to the embodiments described above, but many possibilities to modifications thereof would be apparent to a person with ordinary skill in the art without departing from the basic idea of the invention as defined in the appended claims.

It is pointed out that other surface members having at least one hollow elongated stiffening member integral therewith than such ones used for aircrafts are possible, although the invention is especially applicable to the manufacture of components of vehicles, where an aim to obtain stiffness in this way by light-weight components is particularly interesting. Said surface member may be provided with hollow elongated stiffening members on both large surfaces thereof, and in such a case these may be produced in different steps or by taking appropriate measures at the same time.

When having hollow elongated stiffening members arranged on only one of the large sides of the surface member the large side having no stiffening member applied thereon may have an irregular structure with even distinct edges. This may also be the case on the large side of the surface member onto which the tool is placed as long as this may be well supported by the surface member over the extension of the tool.

The method according to the invention may include more steps than those mentioned above.

The invention claimed is:

1. A method for producing a surface member having at least one hollow, curved, elongated stiffening member integral therewith, the method comprising:
    applying a helical tool having a rigid outer helical support surface on a surface member while shaping the tool on the surface according a to desired longitudinally curved shape,
    laying flabby layers of a fiber composite material in mutual superposition onto said support surface of said tool,
    curing the material applied onto said support surface of said tool, and
    applying a pulling force to one end of the helical tool, thereby reducing a cross-section of the helical tool and withdrawing the tool from the hollow elongated stiffening member formed externally thereof through one end of the material after curing the material, such that the helical tool is used to produce the surface member including at least one longitudinally curved stiffening member shaped by the helical tool,
    wherein laying flabby layers on the support surface of the tool may be carried out before or after applying the tool on a surface member,
    wherein the tool is made of a material sufficiently rigid to maintain the desired longitudinally curved shape during forming of the hollow elongated member and sufficiently flexible to permit the tool to be at least slightly prolonged when applying the pulling force in a longitudinal direction of the tool to at least slightly reduce the cross-section of the tool and to be bent without breaking.

2. The method according to claim 1, wherein the tool laid onto a surface member of an uncured fiber composite laminate, and wherein an entire article comprising the surface member and the at least one elongated member is cured.

3. The method according to claim 1, wherein heat is applied to the surface member with the elongated member thereon for said curing.

4. The method according to claim 1, further comprising:
    enclosing the surface member, support surface and applied layers in at least one bag forming a closed volume; and
    applying a gas over-pressure through the at least one bag onto the surface member, onto the layers applied upon said support surface of the tool and onto inner surfaces of the tool during said curing.

5. The method according to claim 1, further comprising:
    applying on the tool a release foil of a material not binding to said material laid onto said tool, wherein the release foil is applied on said tool before applying said layers of said material onto the tool for facilitating said withdrawal of the tool.

6. The method according to claim 1, further comprising:
    utilizing the surface member having at least one hollow elongated stiffening member integral therewith as a part of an aircraft.

7. The method according to claim 1, wherein the fiber composite comprises carbon fiber epoxy.

8. The method according to claim 1, wherein the fiber composite comprises glass fibre polyester.

9. The method according to claim 1, wherein the tool comprises glass fiber fabric embedded into a matrix plastic cured to a helical shape.

10. The method according to claim 1, further comprising:
    reusing the helical tool to produce additional surface members.

* * * * *